United States Patent
Khotimsky et al.

(10) Patent No.: US 9,806,892 B2
(45) Date of Patent: Oct. 31, 2017

(54) OPTICAL NETWORK UNIT POWER MANAGEMENT IN PASSIVE OPTICAL NETWORKS

(71) Applicants: ZTE Corporation, Shenzhen (CN); ZTE (USA) Inc., Austin, TX (US)

(72) Inventors: Denis Andreyevich Khotimsky, Westborough, MA (US); LiQuan Yuan, Shanghai (CN); DeZhi Zhang, Shanghai (CN)

(73) Assignees: ZTE Corporation, Shenzhen (CN); ZTE (USA) Inc., Richardson, TX (US)

( * ) Notice: Subject to any disclaimer, the term of this patent is extended or adjusted under 35 U.S.C. 154(b) by 25 days.

(21) Appl. No.: 14/414,698

(22) PCT Filed: Jul. 15, 2013

(86) PCT No.: PCT/US2013/050533
§ 371 (c)(1),
(2) Date: Jan. 13, 2015

(87) PCT Pub. No.: WO2014/012109
PCT Pub. Date: Jan. 16, 2014

(65) Prior Publication Data
US 2015/0222440 A1    Aug. 6, 2015

(30) Foreign Application Priority Data

Jul. 13, 2012 (WO) ............... PCT/CN2012/078649

(51) Int. Cl.
*H04J 14/00* (2006.01)
*H04J 14/02* (2006.01)
(Continued)

(52) U.S. Cl.
CPC ............ *H04L 12/12* (2013.01); *H04B 10/27* (2013.01); *H04B 10/272* (2013.01); *H04Q 11/0067* (2013.01); *H04Q 2011/0079* (2013.01)

(58) Field of Classification Search
CPC ................................ H04L 12/12; H04B 10/27
(Continued)

(56) References Cited

U.S. PATENT DOCUMENTS

| 7,756,972 B2* | 7/2010 | Ma ........................... G06F 1/26 709/224 |
| 2009/0201840 A1* | 8/2009 | Pfeiffer, Jr. .......... H04W 8/005 370/310 |

(Continued)

FOREIGN PATENT DOCUMENTS

WO    2008/038981 A1    4/2008

OTHER PUBLICATIONS

ITU-T G987.3 Oct. 2010.*
(Continued)

*Primary Examiner* — Oommen Jacob
(74) *Attorney, Agent, or Firm* — Perkins Coie LLP

(57) ABSTRACT

Techniques for unified optical network unit power management in a passive optical network include operating an optical network unit (ONU) in a first state in which a transmitter of the ONU is turned off and a receiver of the ONU is turned on, operating the ONU in a second state in which both the transmitter and the receiver are turned off, and transitioning the ONU directly between the first state and the second state, based on a power management rule.

15 Claims, 16 Drawing Sheets

(51) Int. Cl.
*H04B 10/08* (2006.01)
*H04L 12/12* (2006.01)
*H04B 10/272* (2013.01)
*H04B 10/27* (2013.01)
*H04Q 11/00* (2006.01)

(58) Field of Classification Search
USPC .............................................. 398/66, 43, 58
See application file for complete search history.

(56) References Cited

U.S. PATENT DOCUMENTS

| | | | |
|---|---|---|---|
| 2010/0111523 A1 | 5/2010 | Hirth et al. | |
| 2010/0118753 A1 | 5/2010 | Mandin et al. | |
| 2012/0027411 A1 | 2/2012 | Gao et al. | |
| 2012/0045210 A1* | 2/2012 | Kim | H04L 41/0893 398/66 |
| 2012/0124444 A1* | 5/2012 | Husted | H04W 52/0216 714/748 |
| 2012/0128357 A1* | 5/2012 | Mukai | H04B 10/272 398/58 |
| 2012/0141119 A1* | 6/2012 | Konno | H04L 12/12 398/25 |
| 2012/0163808 A1 | 6/2012 | Kim et al. | |
| 2012/0166819 A1* | 6/2012 | Skubic | G06F 1/3278 713/300 |
| 2013/0007484 A1* | 1/2013 | Gobriel | G06F 1/3209 713/320 |
| 2014/0193150 A1* | 7/2014 | Mukai | H04L 12/44 398/67 |
| 2015/0222440 A1* | 8/2015 | Khotimsky | H04B 10/272 398/58 |

OTHER PUBLICATIONS

European Search Report mailed on Jul. 7, 2015 for European Application No. 13816034.6, filed Jul. 15, 2013 (7 pages).

International Search Report and Written Opinion mailed on Oct. 22, 2013 for International Application No. PCT/US2013/050533, filed Jul. 15, 2013 (10 pages).

ITU-T Telecommunication Standard Sector of ITU, "10-Gigabit-capable passive optical networks (XG-PON): Transmission convergence (TC) layer specification," G.987.3, 131 pages, Oct. 2010.

Dhaini, A., et al., "Toward Green Next-Generation Passive Optical Networks," IEEE Communications Magazine, 49 (11):94-101, Nov. 2011.

Office Action mailed on Mar. 8, 2016 for Japanese Application No. 2015-521885, filed Jul. 15, 2013 (7 pages).

* cited by examiner

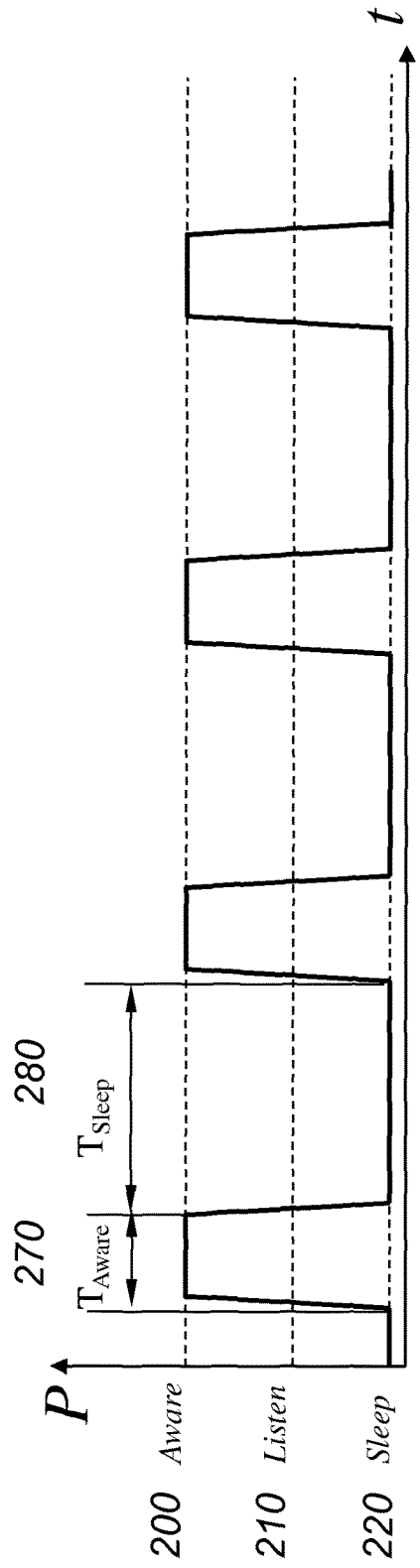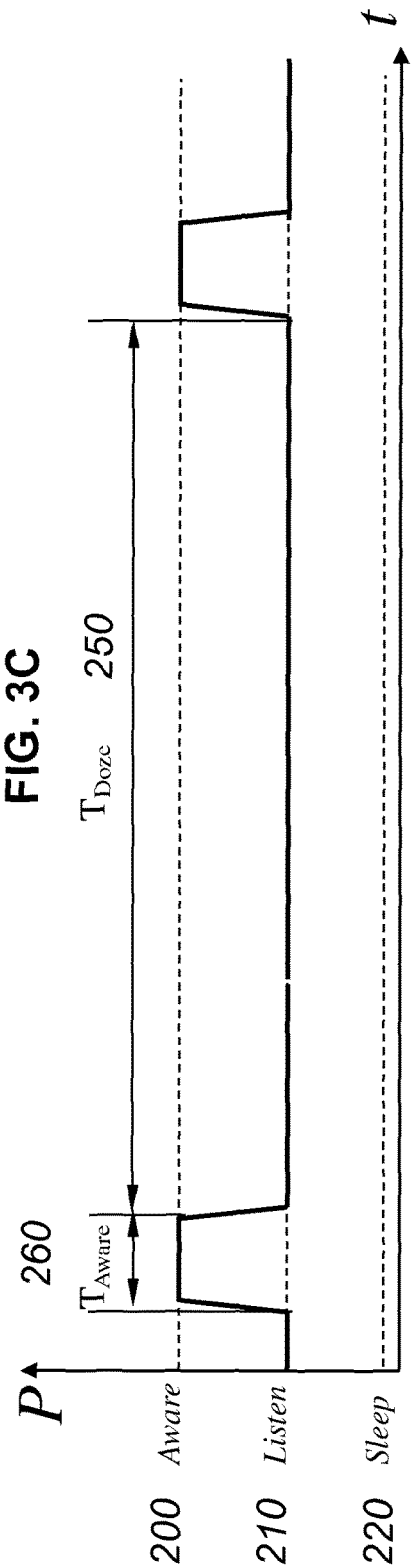
FIG. 3C
FIG. 3B

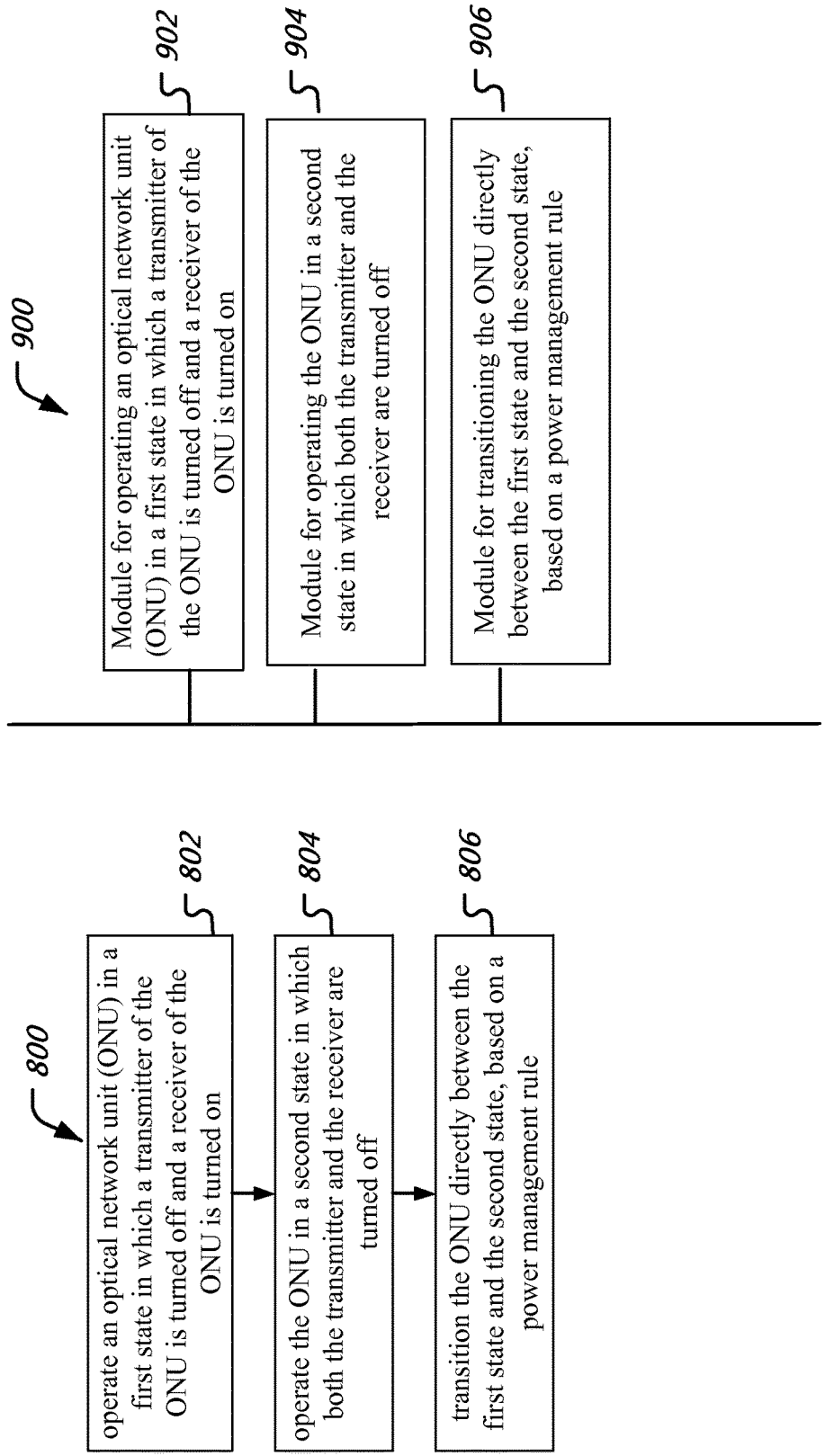

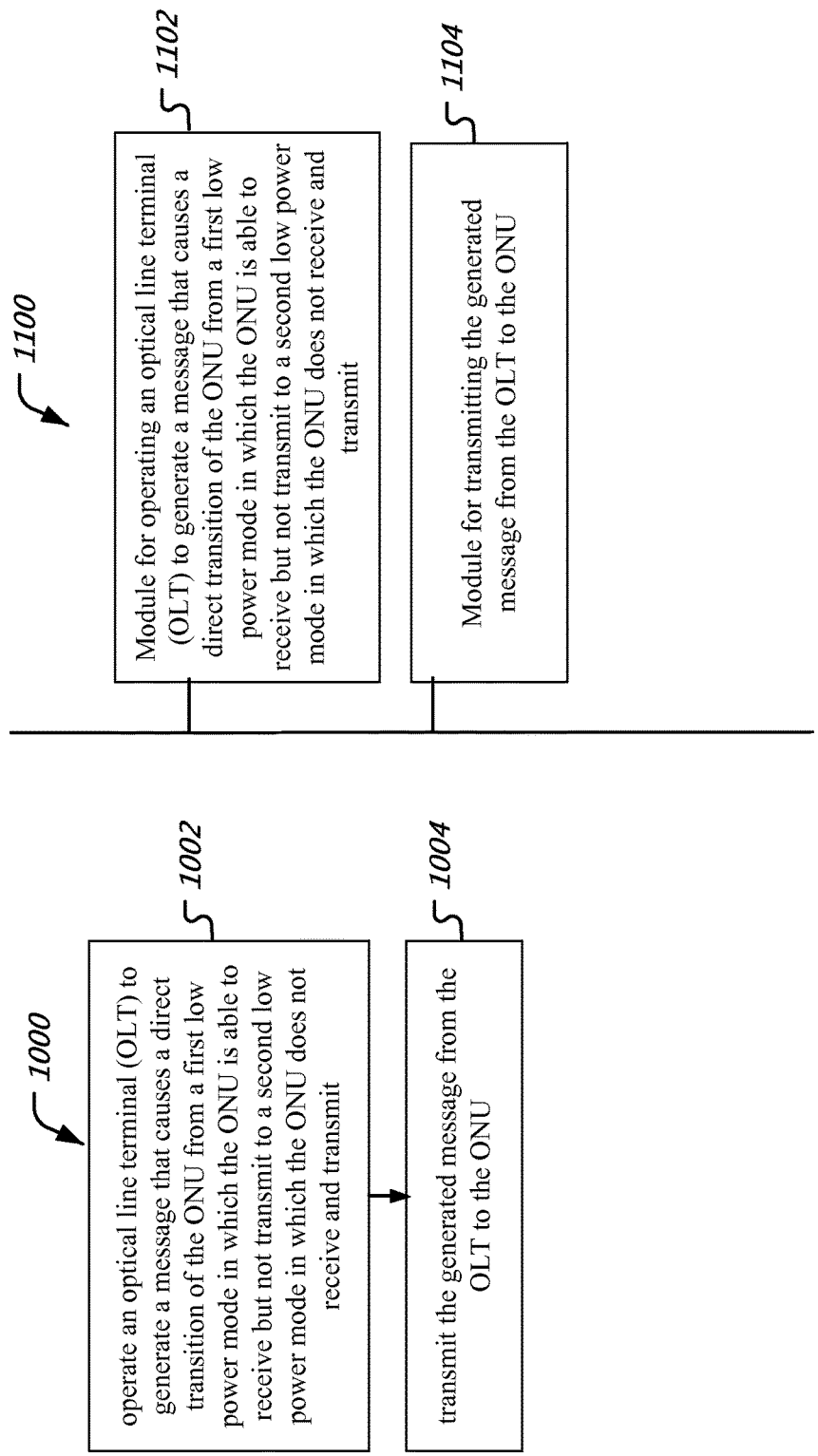

OPTICAL NETWORK UNIT POWER MANAGEMENT IN PASSIVE OPTICAL NETWORKS

CROSS-REFERENCE TO RELATED APPLICATIONS

This patent document claims the benefit of priority under the Paris Convention of International Patent Application No. PCT/CN2012/078649, filed on Jul. 13, 2012, and entitled "METHOD AND APPARATUS FOR UNIFIED OPTICAL NETWORK UNIT (ONU) POWER MANAGEMENT IN A PASSIVE OPTICAL NETWORK (PON)." The disclosure of the before-mentioned application is incorporated by reference as part of this patent document.

BACKGROUND

This patent document relates to systems, devices, and techniques for data communications in a passive optical network. In one aspect, this document relates to power saving in an optical network unit (ONU) of a passive optical network (PON).

A PON is an optical network architecture based on point-to-multipoint (P2MP) topology in which a single optical fiber and multiple passive branching points are used to provide data communication services. A PON system can facilitate user access with a service provider communication facility to access telecommunication, information, entertainment, and other resources of the Internet. A PON system can include a central node, called an optical line terminal (OLT), which can be in connection with a single or multiple user nodes called ONUs via a passive optical distribution network (ODN). An OLT can be located at the access provider's communication facility (e.g., central office). An ONU can be located at or near the access user's premises. An ONU typically draws electrical power from the user's premises power supply network and may employ battery backup to support communication services in case of power outage.

Better power management techniques can help improve battery life of an ONU.

SUMMARY

Method and apparatus are disclosed that, in one beneficial aspect, are useful to reduce the power consumption of an optical network unit in a PON. Implementations described in this document can provide several advantages. For example, the disclosed techniques can allow an access provider to guarantee lifeline services to customers by increasing the duration of operational time during power outages. The techniques can also be used to reduce the size and cost of the battery backup unit, reduce overall green-house gas emission and carbon footprint of the information and communication technologies based on passive optical networks, and so on.

In one example aspect, an optical communication method is disclosed. The method includes operating an ONU in a first state in which a transmitter of the ONU is turned off and a receiver of the ONU is turned on, operating the ONU in a second state in which both the transmitter and the receiver are turned off and transitioning the ONU directly between the first state and the second state, based on a power management rule.

In another example aspect, a PON system is disclosed. The PON includes an ONU and an OLT. The ONU is operable in a first low power mode in which the ONU is able to receive but not transmit and a second low power mode in which the ONU is not able to either receive or transmit. The OLT is communicably coupled to the ONU and is configured to transmit a control message to the ONU to control at least one aspect of a transition of the ONU between the first low power mode and the second low power mode.

These, and other, features are further described with reference to the drawings.

BRIEF DESCRIPTION OF THE DRAWINGS

FIG. 3B illustrates a power consumption profile of a conventional power management technique based on ONU dozing.

FIG. 3C illustrates a power consumption profile of a conventional power management technique based on cyclic sleeping.

FIG. 8 is a flow chart representation of a unified power management method.

FIG. 9 is a block diagram representation of a portion of an apparatus that implements unified power management technique disclosed in the document.

FIG. 10 is a flow chart representation of a process of operating an OLT.

FIG. 11 is a block diagram representation of a portion of an apparatus for optical communications.

DETAILED DESCRIPTION

Techniques for unified power management of an optical network unit (ONU) in which the ONU can transition between multiple low power states without having to transition to a high power state are disclosed. The terminology in the description that follows, to the extent used in the ITU-T XG-PON standards documents and not explicitly discussed in this document, is intended to be consistent with the ITU-T standards documents.

The techniques described in this document, in one beneficial aspect, are useful to reduce the power consumption of an optical network unit in a PON. Implementations described in this document can provide one or more advantages depending on specifics in certain applications. For example, the disclosed techniques can allow an access provider to guarantee lifeline services to customers by increasing the duration of operational time during power outages. The techniques can also be used to reduce the size and cost of the battery backup unit, reduce overall greenhouse gas emission and carbon footprint of the information and communication technologies based on passive optical networks, and so on. The disclosed techniques are superior in terms of power saving efficiency to available prior state-of-the-art techniques. For example, the disclosed techniques are superior to a Dozing method implemented in some systems where the receiver is on for checking data while transmitter is off, at least due to substantially lower on average power level during the low power cycle. The disclosed technique is also superior to a cyclic sleep method implemented in some systems where both receiver and transmitter are off at least because of the decoupling of the external stimulus latency from the power efficiency and, consequently, substantially larger possible relative duration of the low power cycle. In one beneficial aspect, the disclosed techniques allow ONUs to transition between a dozing state and a sleep state.

A PON system can use optical fiber to connect the user premises to the provider communication facility. The PON Optical Distribution Network (ODN) can include a point-to-multipoint (P2MP) optical fiber infrastructure where passive branching points can be represented by optical splitters are other similar passive optical devices. These passive ODN equipments can be deployed in street cabinets, closets, underground utility holes, cable chambers, and other installations and require no electrical power and little maintenance. The PON ODN can be attached to the OLT with a single strain of optical fiber.

Figure 1:
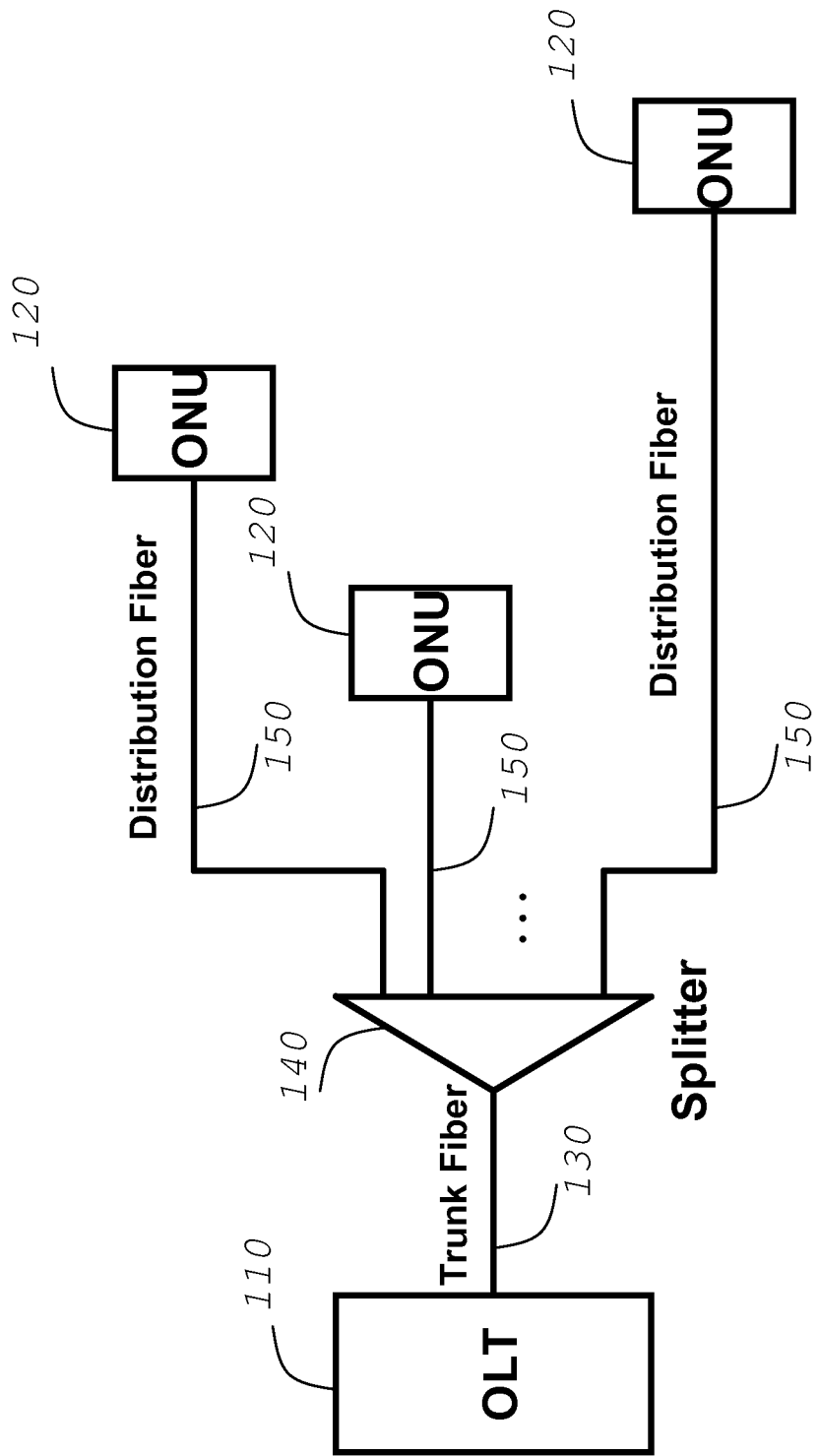
FIG. 1 depicts an example of a PON system.

FIG. 1 shows an exemplary PON system comprising an OLT 110, plurality of ONUs 120; and an ODN that comprises optical feeder fiber, or trunk fiber 130, a splitter 140, and multiple distribution fibers 150.

ONUs 120 can be deployed at or near user premises. An ONU is an active network element that typically draws electric power from the power supply network present at or near the access user's premises and in some cases is equipped with a battery-based power backup unit to allow limited operations in case of the power supply network failure. Conservation of the power consumed by an ONU is an operation requirement that can be associated with two objectives. First, the requirement is driven by the emergency services support under the power supply network failure and is targeted at the prolongation of the battery operation time or, alternatively, reduction of the size and cost of the battery. Second, the requirement focuses on conserving power in regular (based on the power supply network) operations and minimizing the carbon dioxide emissions generated by information and communications technologies (ICTs).

Conventional standard-based PON systems, such as Ethernet PON (EPON), Broadband PON (BPON), Gigabit PON (G-PON) consider an ONU to be in a permanent link-layer association with the OLT: the ONU continuously listen to the downstream transmission over the P2MP optical channel and may be required to transmit protocol information upstream, even if there is no user data to exchange. Therefore, the ONU's optical transceiver continuously remains fully operational and fully powered. These conventional PON systems typically support only the basic, one-sided power conservation technique, such power shedding, characterized by powering off or reducing power to non-essential functions and services while maintaining a fully operational optical link.

Various advanced standard-based PON systems, such as 10 Gigabit/sec EPON (10G-PON), and 10 Gigabit/sec PON (XG-PON), employ protocol-based power-saving techniques based on a signalling mechanism between the OLT and the ONU to function properly. These techniques involve defining several power levels and specifying the cyclic behavior of an ONU which periodically switches between the full power level and one lower power level.

Besides the full power level, the standard-based 10 Gigabit/sec PON (XG-PON) system identifies the ONU Dozing power level, which is characterized by powering off of the ONU transmitter and the associated circuitry for substantial periods of time on the condition that the receiver remains continuously on, and the ONU Sleeping power level, which is characterized by both ONU transmitter and ONU receiver are turned off for substantial periods of time.

Figure 7A:
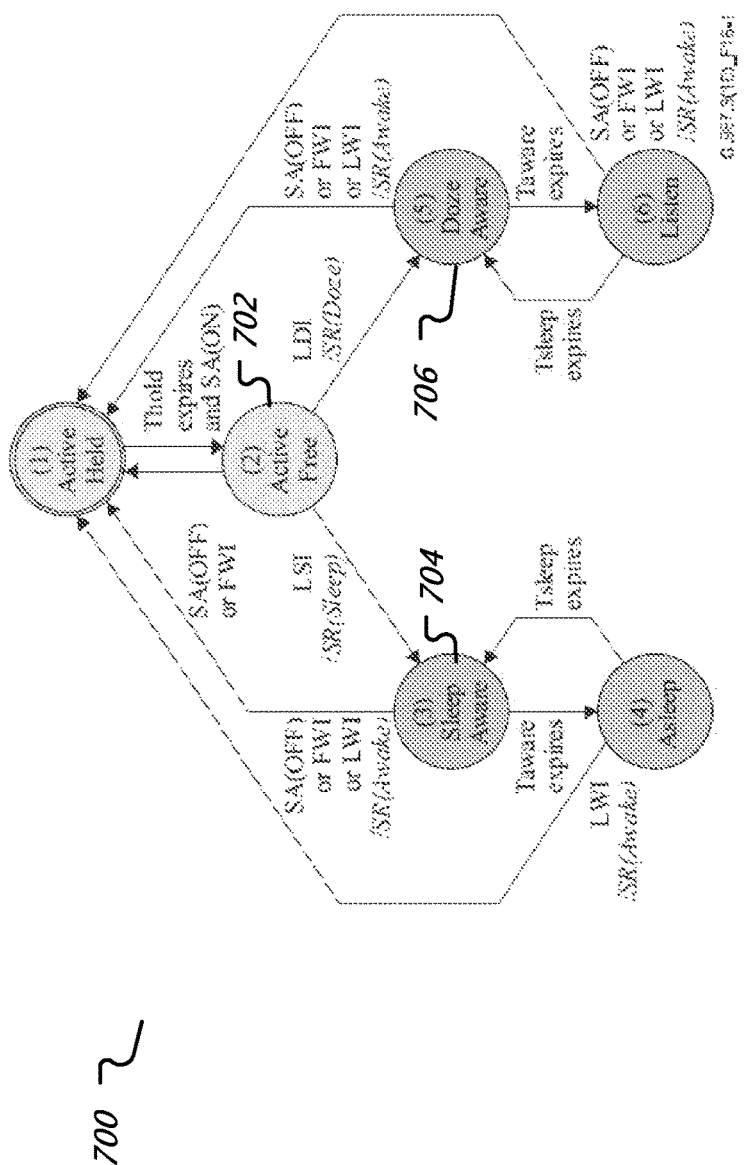
FIG. 7A illustrates a prior art state machine for ONU power management.

FIG. 7A shows the state machine behavior 700 of a PON ONU, as specified in one currently published PON standard (ITU-T G.987.3, 10-Gigabit-capable passive optical networks (XG-PON): Transmission convergence (TC) layer specification, publication date October 2010). From the initial state "Active Free" 702, the ONU can either transition into a Sleep Aware state 704 or a Doze Aware state 706 (further described below). However, no direct transition between the Doze Aware and the Sleep Aware states 704, 706 are provided. Conventional ONUs therefore lack the technology of directly transitioning between two low power consumption states without having to go through an active state (e.g., a full powered state). In one detrimental aspect, such a transition through the active state may increase the power consumed by the ONU, thereby undesirably reducing batter life.

Figure 2:
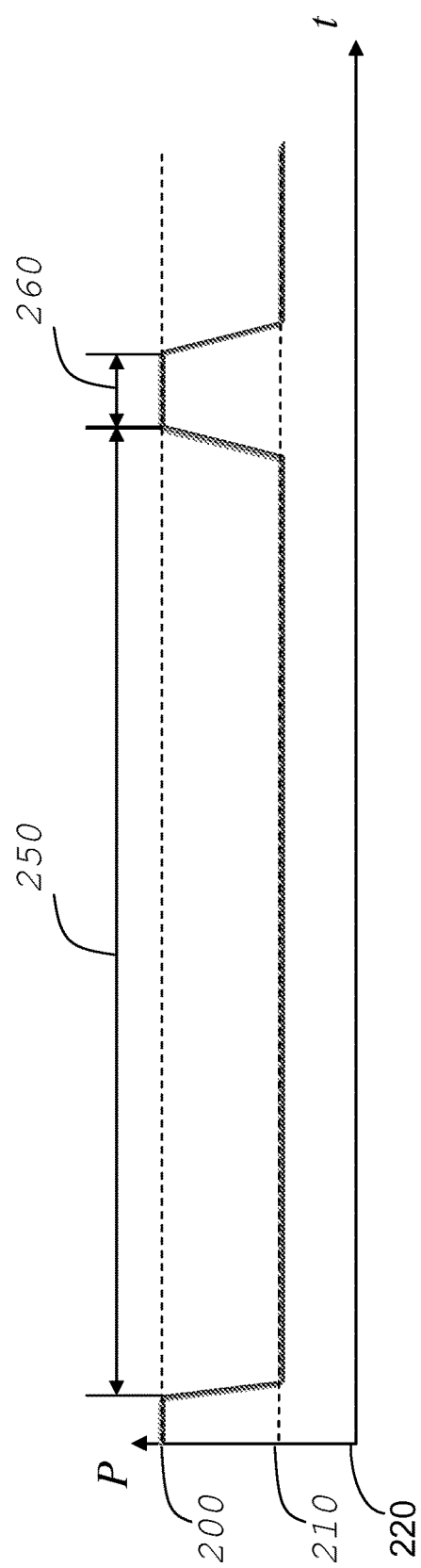
FIG. 2 illustrates a power consumption profile of a conventional power management technique based on ONU dozing.

FIG. 2 depicts example ONU power consumption profile, that is, the power P consumed by the ONU as a function of time t, in a case where ONU Dozing mode is implemented. The full power level 200 is characterized by both ONU receiver and ONU transmitter being power on with associated circuitry. The dozing power level 210, which is lower than full power level 200, but substantially higher than zero (or sleep mode 220), is characterized by the ONU transmitter with the associated circuitry being powered off, and the transmitter remaining on. In other words, the ONU is in a "listen" mode to receive data or signals, but not in a "talk" mode to transmit data or signals. Two timing parameters, which can be configured into the ONU in advance, govern specific pattern of the power consumption: time interval 250 ($T_{Doze}$) is the maximum time an ONU can be allowed to abstain from upstream transmissions without being declared in violation of the protocol, while the time interval 260 ($T_{Aware}$) is the minimum time required for the OLT and ONU to perform periodic bi-directional handshake with both ONU transmitter and ONU receiver being fully powered and fully operational. The longer the time interval 250 is with respect to time interval 260, the more efficient the technique is in relative terms. Since the ONU receiver remains continuously powered, the latency of detecting an external wake-up stimulus (a signal form the OLT to enter full power operation, in response, for example, to an incoming call) is close to that of full-power operation and is comparable to round-trip propagation delay. This is beneficial. The continuously powered ONU receiver may limit the overall power-saving efficiency.

Figure 3A:
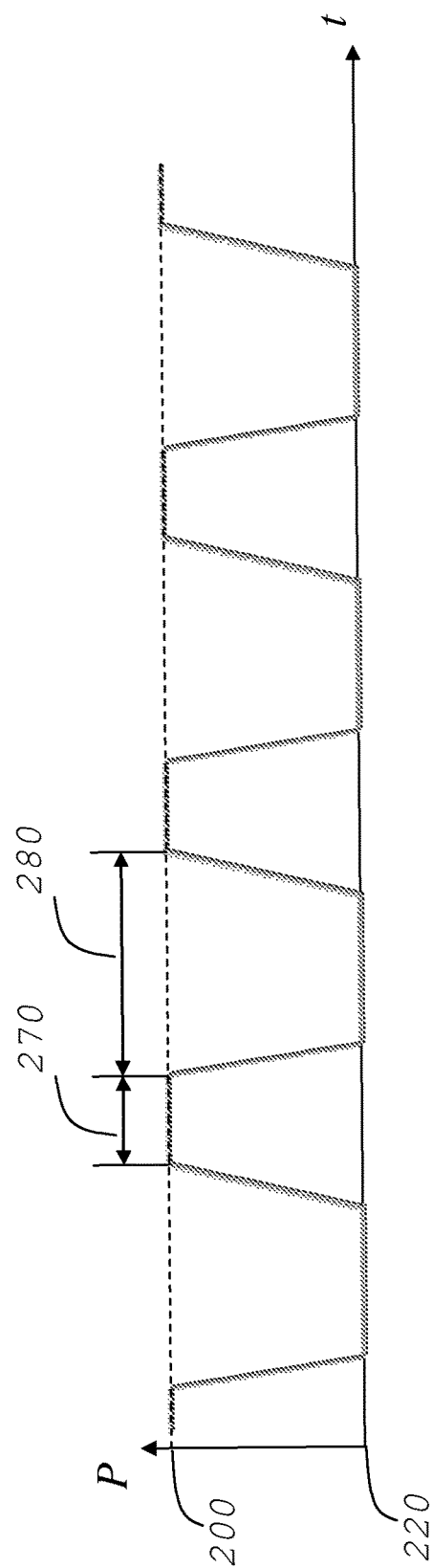
FIG. 3A illustrates a power consumption profile of a conventional power management technique based on cyclic sleeping.

FIG. 3A depicts example ONU power consumption profile, that is, the power P consumed by the ONU as a function of time t, when ONU Cyclic sleep mode is implemented. The full power level 200 is characterized by both ONU receiver and ONU transmitter being power on with associated circuitry. The sleeping power level 220, is characterized by both the ONU transmitter and ONU receiver with the associated circuitry being powered off, and is typically close to zero. Two configurable timing parameter govern specific pattern of the power consumption: time interval 270 (similar to $T_{Aware}$) is the minimum time required for the OLT and ONU to perform periodic bi-directional handshake with both ONU transmitter and ONU receiver being fully powered and fully operational; time interval 280 ($T_{Sleep}$) is the maximum time an ONU can be allowed to abstain from upstream transmissions and from receiving downstream traffic at the same time. While turning off both the transmitter and receiver is the most efficient way to save power, the latency of detecting an external wake-up stimulus may increase by as much as the time interval 280. Therefore, in order to maintain sufficiently short external wakeup latency, time interval 280 may be kept small, thus reducing the overall power efficiency.

Both the above discussed cyclic power management techniques (FIG. 2 and FIG. 3A) involve the ONU toggling between two power levels: the full power level and the Dozing level (FIG. 2) or between the full power level and the sleeping level (FIG. 3A). In some implementations, the power management behavior of an ONU may be configured by specifying two parameters: the maximum time in the lower power mode, and the minimum time in the full power mode. The values of the configuration parameters depend on the kind of services a system is expected to support, as well as the required availability of those services.

FIGS. 3B and 3C, respectively, provide another depiction of the dozing and sleep modes of operation, previously described, by explicitly showing the sleep state power level 220 in the charts.

Figure 3D:
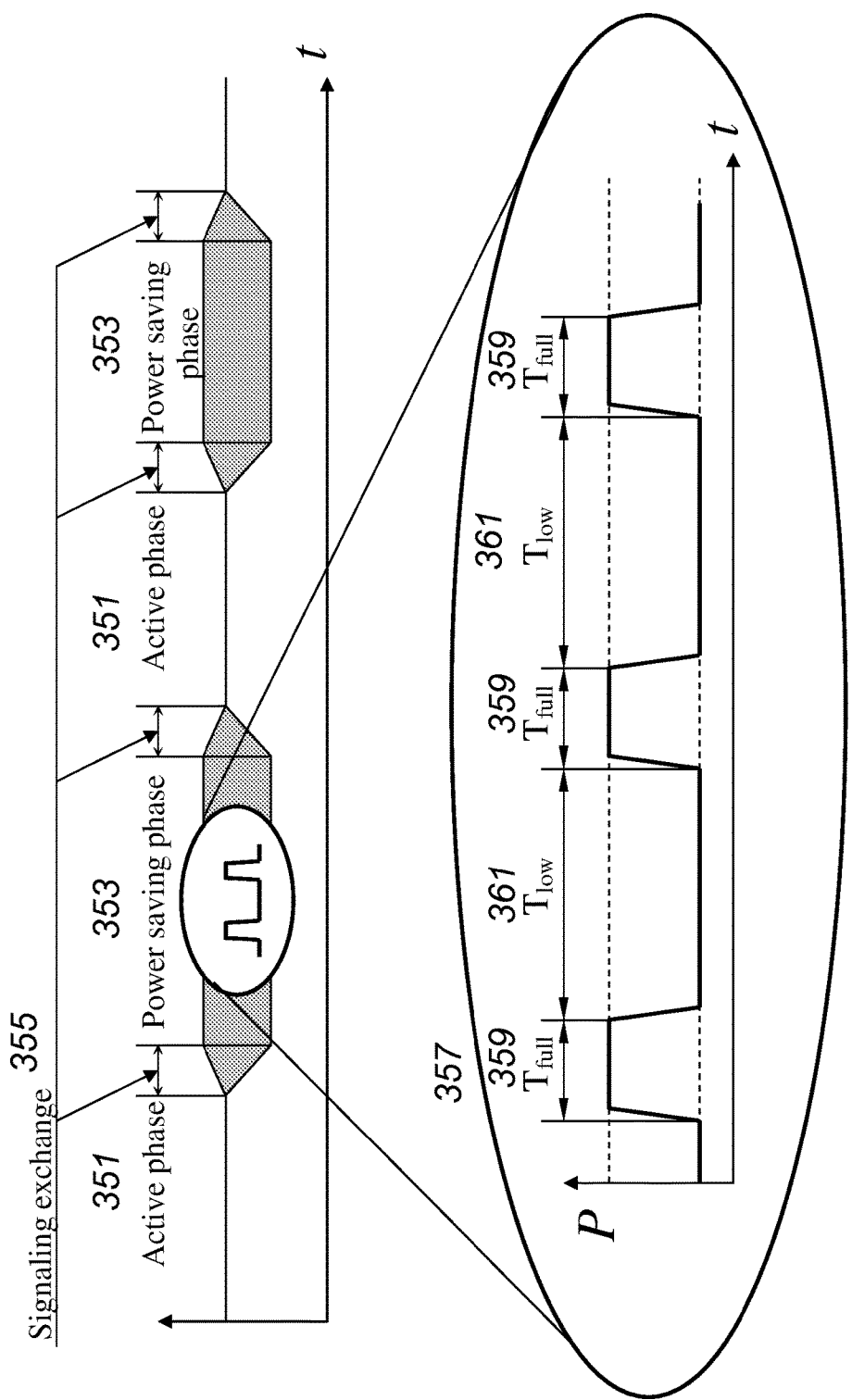
FIG. 3D illustrates a double-nested cyclic profile that either includes cyclical sleeping or includes cyclical dozing.

FIG. 3D provides an illustrative representation that combines the above discussed sleep mode and dozing mode into a single graphical representation. An ONU alternates between the full power phase 351 and a lower power phase 353. While in in a low-power phase, an ONU alternates between two power consumption levels (depicted in inset 357): a full power level 359 and a low power level 361. In a pure doze mode, the ONU's latency in detecting an external wakeup stimulus is comparable to a round trip propagation delay, and the configured sojourn in a state with the low power level (Listen state) primarily depends on how long the OLT can afford to keep the ONU out-of touch. This value can be quite large and limited, for example, by the need to periodically adjust the equalization delay. In the cyclic sleep mode, the ONU's latency in detecting an external wakeup stimulus includes the sojourn in the low power state (Asleep state) and, therefore, the configured sojourn in a state with the low power level is substantially shorter—perhaps, by several orders of magnitude, compared with the doze case. Signals related to wake-up and sleep operations may be exchanged (355) at transitions between active phase 351 and power saving phase 353.

In one aspect, in some embodiments, the unified power management method disclosed in this document integrates the two cyclic power management techniques generally shown in FIGS. 7A, 2 and 3A, in a single unified behavior that involves ONU power consumption alternating between at least three levels and is controlled by at least four timing parameters. Under this integration, when in a power saving mode, the ONU spends most of the time toggling between the Sleeping power level (with the lowest power consumption) and the Dozing power level (with the next lowest power consumption), only occasionally returning to the full-power level operation.

Figure 4A:
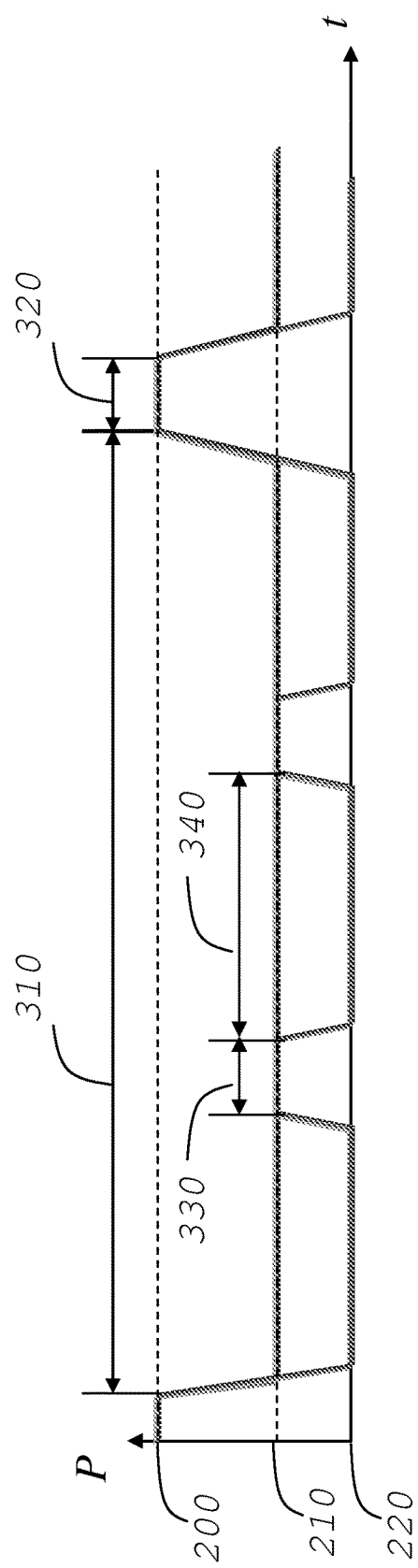
FIG. 4A illustrates a power consumption profile of an embodiment of the disclosed unified ONU power management method.

FIG. 4A shows one example power profile of the unified power management technique. In this example, the full power level 200 is characterized by both ONU receiver and ONU transmitter being power on with associated circuitry. The sleeping power level 220, is characterized by both the ONU transmitter and ONU receiver with the associated circuitry being power off, and is reasonably close to zero. The intermediate dozing power level 210 is characterized by the ONU transmitter with the associated circuitry being power off, and ONU receiver remaining on. Time interval 320 (similar to time intervals 260 and 270) is the minimum duration of the periodic bi-directional handshake between the OLT and the fully powered and operational ONU. Time interval 310 ($T_{LowPower}$) is the maximum allowed duration between consecutive bi-directional handshakes. Time interval 330 is the minimum time that the ONU listens to the downstream transmission in order to obtain any necessary signalling indications. Time interval 340 is the maximum time the ONU is allowed to abstain from upstream transmissions and from receiving downstream traffic at the same time.

As can be seen, the power reduction during the low power cycle depends on the ratio of time interval 310 to time interval 320, which can be made large, while the latency in response to an external stimulus depends on time interval 340, which can be relatively small. Therefore, in one advantageous aspect, the disclosed unified power management technique is superior in terms of power saving efficiency to both the Dozing method, due to substantially lower on average power level during the low power cycle, and the Cyclic Sleep method (as previously discussed with respect to FIGS. 2 and 3A), due to decoupling of the external stimulus latency from the power efficiency and, consequently, substantially larger possible relative duration of the low power cycle.

It will be appreciated that the specific values of the time intervals 310, 320, 330 and 340 may be implementation-specific and may depend on operational considerations such as regulatory requirements, target time for battery life, and so on. For example, maximum dwell time in sleep state may be about 1 to 2 seconds, so that the ONU is responsive to an incoming call within a couple of seconds. Similarly, maximum dwell time in the doze state may be relatively large (e.g., several tens of seconds or minutes, e.g., 2 minutes or 1 hour).

Figure 4B:
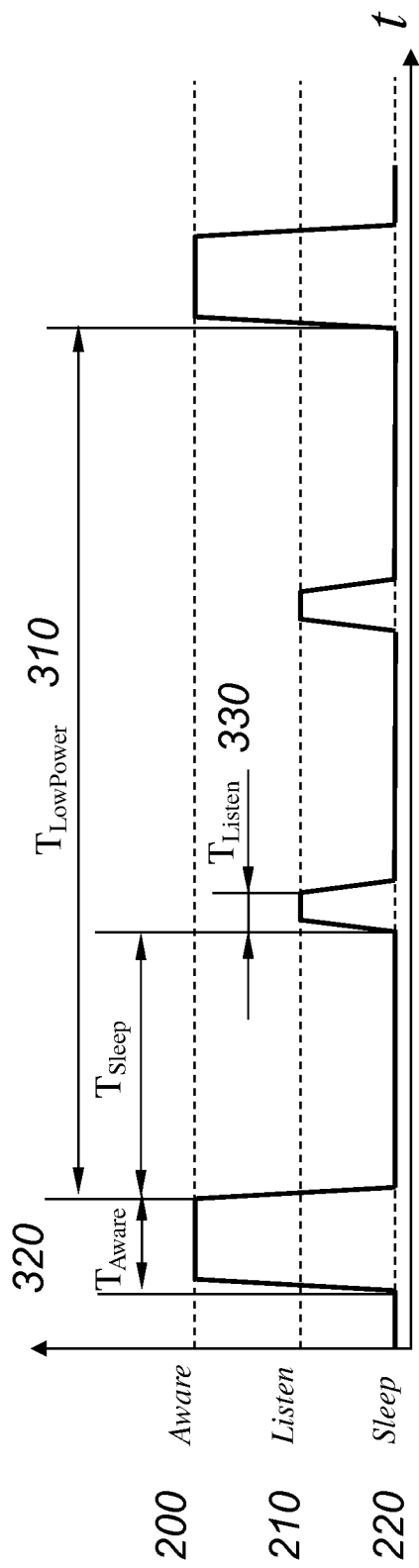
FIG. 4B illustrates a power consumption profile of an embodiment of the disclosed unified ONU power management method, with sleep mode power consumption shown on the same chart.

FIG. 4B is an alternative illustration of the power profile in a unified power management embodiment. Some implementation examples are provided below based the disclosed power management technology.

Low Power Mode Signaling Between OLT and ONU

In some implementations, the low power primitives specified in the following tables can be exchanged between OLT and ONU via appropriate management channel.

TABLE 1

OLT Low power management primitives

| Primitive | Semantics |
| --- | --- |
| LPM-Allow | OLT grants consent to ONU's transition into a low power mode |
| LPM-Disallow | OLT withdraws consent to ONU's transition into a low power mode |

TABLE 2

ONU Low power indication primitives

| Primitive | Semantics |
| --- | --- |
| LPI-LowPower | ONU indicates its transition into a low power mode |
| LPI-Awake | ONU indicates its exit from a low power mode |

ONU Power Management State Machine

Figure 5:
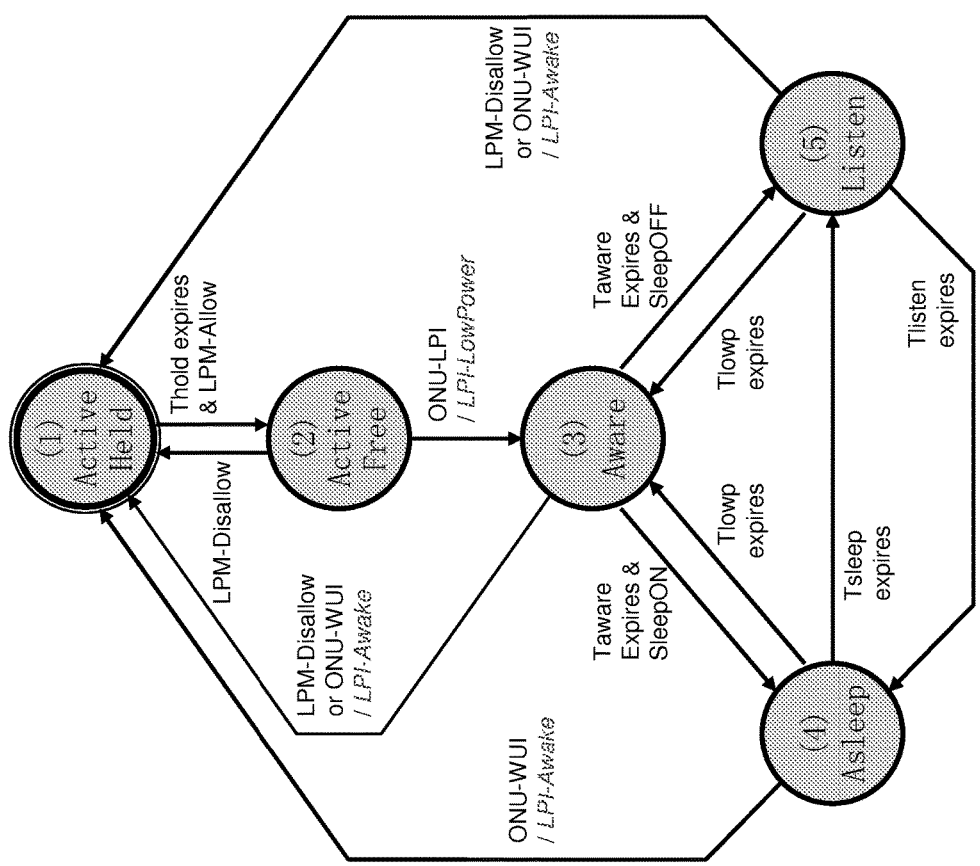
FIG. 5 illustrates a state machine that governs ONU's behavior in an embodiment of the unified power management method.

In some implementations, each ONU maintains an instance of the power management state machine that is characterized by the following states and the state transitions as shown in FIG. 5.

TABLE 3

ONU power management states

| State | Semantics |
| --- | --- |
| (1) ActiveHeld | A full power mode state in which full power operation is mandated by the OLT. The ONU is fully responsive, forwarding downstream traffic and responding to all bandwidth allocations. Power management state transitions do not occur. The minimum sojourn in this state is enforced by the Thold timer.<br>Both the OLT's consent and ONU's local decision are required for the ONU to enter a low power mode. |
| (2) ActiveFree | A full power mode state in which full power operation is at ONU's discretion. The ONU is fully responsive, forwarding downstream traffic and responding to all bandwidth allocations. The OLT has consented to ONU's transition into a low power mode, which is now a subject to ONU's local decision.<br>Upon transition into the Aware state (which is stipulated by the local stimulus ONU-LPC), the ONU sends an LPI-LowPower message to the OLT. |
| (3) Aware | A low power mode state allowing periodic bi-directional handshake between the OLT and ONU. Both ONU receiver and transmitter remain on. The ONU forwarding downstream traffic and responding to all bandwidth allocations. The sojourn in the state is parametrically controlled, if not truncated by the local stimulus ONU-WUC.<br>The state transitions between the three low power states, Aware, Asleep, and Listen, do not involve any external signalling. Upon transition into the ActiveHeld state (which is forced by an LPM-Disallow message or a local stimulus ONU-WUC), the ONU sends an LPI-Awake message to the OLT. |
| (4) Asleep | A low power mode state in which the ONU shuts down both its receiver and transmitter, retaining the ability to wake up on local stimulus ONU-WUC. The sojourn in the state is parametrically controlled, if not truncated by a local stimulus ONU-WUC. Before exiting this state, the ONU ensures that it is fully powered up, synchronized, and capable of responding to both upstream and downstream traffic and control.<br>The state transitions between the three low power states, Aware, Asleep, and Listen, do not involve any external signalling. Upon transition into the ActiveHeld state (which is forced by a local stimulus ONU-WUC), the ONU sends an LPI-Awake message to the OLT. |
| (5) Listen | A low power mode state in which the ONU has its transmitter off, but the receiver on. The ONU listens to the downstream signal and forwards downstream traffic, while retaining the ability to reactivate the transmitter on local stimulus ONU-WUC or upon receipt of LPM-Disallow message. The sojourn in the state is parametrically controlled if not truncated by a local stimulus ONU-WUC or LPM-Disallow message. Before exiting this state, the ONU ensures that it is fully powered up, synchronized, and capable of responding to both upstream and downstream traffic and control.<br>The state transitions between the three low power states, Aware, Asleep, and Listen, do not involve any external signalling. Upon transition into the ActiveHeld state (which is forced by an LPM-Disallow message or a local stimulus ONU-WUC), the ONU sends an LPI-Awake message to the OLT. |

In some implementations, an ONU maintains a pair of complementary, mutually exclusive internal conditions specified as follows.

TABLE 4

ONU internal power conditions

| Condition | Semantics |
|---|---|
| ONU-LPC | ONU Low Power Condition is based on local dynamic operational and traffic load characteristics indicating that the ONU may go into low power mode. |
| ONU-WUC | ONU Wake-Up Condition is based on local dynamic operational and traffic load characteristics indicating that the ONU must remain fullypowered. |

In some implementations, the ONU maintains the following timing parameters to control the ONU power management state machine and allows to specify the initial values of the timers as follows.

TABLE 5

ONU timing parameters

| Timer | Semantics |
|---|---|
| Thold | The minimum sojourn in the ActiveHeld state. The timer is initialised upon transition into the ActiveHeld state and blocks transition into the ActiveFree state until expiration. |
| Taware | The minimum sojourn in the Aware state, which defines the duration of the periodic bi-directional handshake between the OLT and an ONU in a low power mode. The timer is initialised upon transition into the Aware state; its expiration releases ONU's transition to either Asleep or Listen state. |
| Tlowpower (or Tlowp) | The maximum combined sojourn in the Asleep and Listen states between successive periodic bi-directional handshakes. The timer is initialised upon transition from the Aware state to either Asleep or Listen state; its expiration forces ONU's transition back to the Aware state. |
| Tsleep | The maximum sojourn in the Asleep state. The timer is initialised upon transition into the Asleep state; its expiration forces ONU's transition into the Listen state. To configure pure Sleep mode operation, the initial value is set to infinity with finite Tlisten and Tlowp initial values. |
| Tlisten | The maximum sojourn in the Asleep state. The timer is initialised upon transition into the Listen state; its expiration forces ONU's transition into the Asleep state. To configure pure Doze mode operation, the initial value is set to infinity with finite Tsleep and Tlowp initial values. |

To support unified operation using three distinct power levels, in some implementations, the ONU timing parameters Tsleep and Tlisten are initialized each to a finite non-zero value, while Tlowpower is initialized to a finite value much larger than the initial values of either Tsleep or Tlisten. Then, during operation, values can be adjusted through parameter configuration to either Dozing or Cyclic Sleep modes. To implement Cyclic Sleep, timing parameter Tsleep may be initialized to infinity, timing parameter Tlisten may be initialized to zero, and timing parameter Tlowp may be initialized to finite non-zero value. To implement ONU Dozing, timing parameter Tlisten may be initialized to infinity, timing parameter Tsleep may be initialized to zero, and timing parameter Tlowp may be initialized to a finite non-zero value.

In the state diagram depicted in FIG. 5, the binary flag SleepOFF (SleepOn being its binary complement) is a matter of notational convenience which is used to indicate the operation of the machine in the ONU dozing mode. An alternative implementation could make a transition from Aware state upon expiration of the Taware timer unconditionally into the Asleep state. In the ONU dozing mode, Tsleep is initialized to zero, and the transition to Listen would immediately follow.

OLT Power Management State Machine

Figure 6:
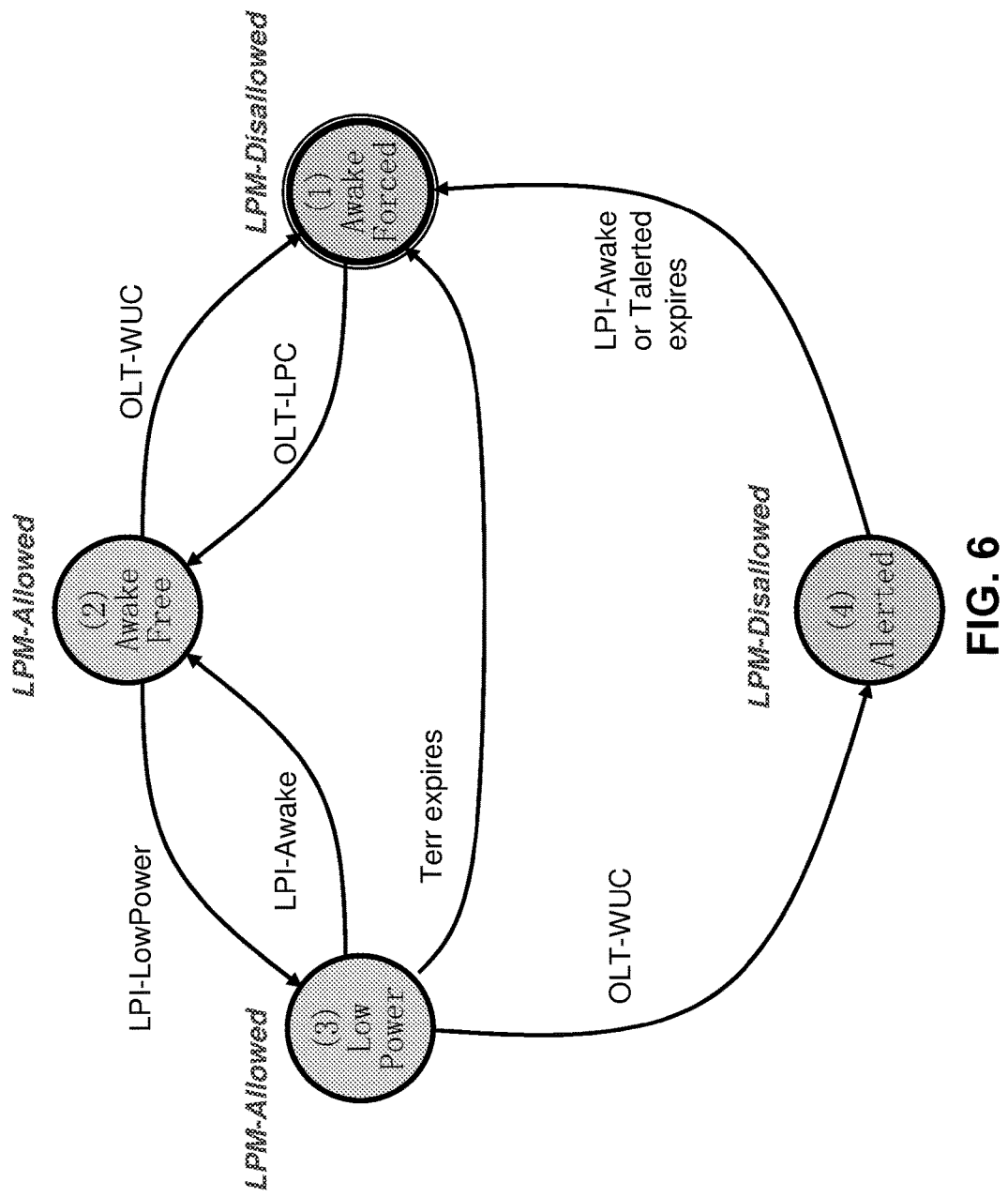
FIG. 6 illustrates a state machine that governs OLT's behavior in an embodiment of the unified power management method.

In some implementations, the OLT maintains an instance of the state machine for each subtending ONU that is characterized by the following states and the state transitions as shown in FIG. 6.

TABLE 6

OLT power management states

| State | Semantics |
|---|---|
| (1) AwakeForced | The OLT holds the ONU in a full power mode. The OLT provides normal allocations to ONU, forwards downstream traffic, and expects a response to every bandwidth grant. Upon transition to and periodically during the sojourn in this state, the OLT sends a LPM-Disallow message to the ONU. |
| (2) AwakeFree | The OLT consents to the ONU's transition into a low power mode. The OLT provides normal allocations to ONU, forwards downstream traffic, and expects a response to every bandwidth grant. Upon transition to and periodically during the sojourn in this state, the OLT sends a LPM-Allow message to the ONU. |
| (3) LowPower | The OLT is aware that the ONU is in a low power mode. The OLT provides at least signalling allocations to ONU, optionally forwards downstream traffic, but does not expect a response to every bandwidth grant. |

TABLE 6-continued

OLT power management states

| State | Semantics |
|---|---|
| (4) Alerted | Upon transition to and periodically during the sojourn in this state, the OLT sends a LPM-Allow message to the ONU.<br>The OLT attempts to bring the ONU back into a full power mode.<br>The OLT provides at least signalling allocations to ONU, optionally forwards downstream traffic, but does not expect a response to every bandwidth grant.<br>Upon transition to and periodically during the sojourn in this state, the OLT sends a LPM-Disallow message to the ONU. |

In some implementations, the OLT maintains a pair of complementary, mutually exclusive internal conditions for each subtending ONU specified as follows.

TABLE 7

OLT internal power conditions

| Condition | Semantics |
|---|---|
| OLT-LPC | OLT Low Power Condition for a given ONU is based on local dynamic operational and traffic load characteristics indicating that the OLT consents to ONU going into a low power mode. |
| OLT-WUC | OLT Wake-Up Condition for a given ONU is based on local dynamic operational and traffic load characteristics indicating that the OLT objects to ONU going into a low power mode. |

In some implementations, the OLT maintains the following timing parameters to control an instance of the OLT power management state machine and allows to specify the initial values of the timers as follows.

TABLE 8

OLT timing parameters

| Timer | Semantics |
|---|---|
| Terr | The maximum allowed time between bi-directional handshakes between the OLT and the ONU in a low power mode. The timer is initialised upon transition into the LowPower state and is restarted each time OLT receives a transmission from the ONU. Expiration of the timer indicates a low power mode timing violation by the ONU, in which case the OLT executes a transition into AwakeForced to diagnose alleged loss of the ONU. |
| Talerted | The maximum allowed time for the ONU to come out of the low power mode upon OLT's instruction to do so. The timer is initialised upon transition into the Alerted state. Expiration of the timer indicates a low power mode timing violation by the ONU, in which case the OLT executes a transition into AwakeForced to diagnose alleged loss of the ONU. |

Referring to FIGS. 7A through 7E, the present power management technology can improve power efficiency in the system shown in FIG. 7A.

Figure 7B:
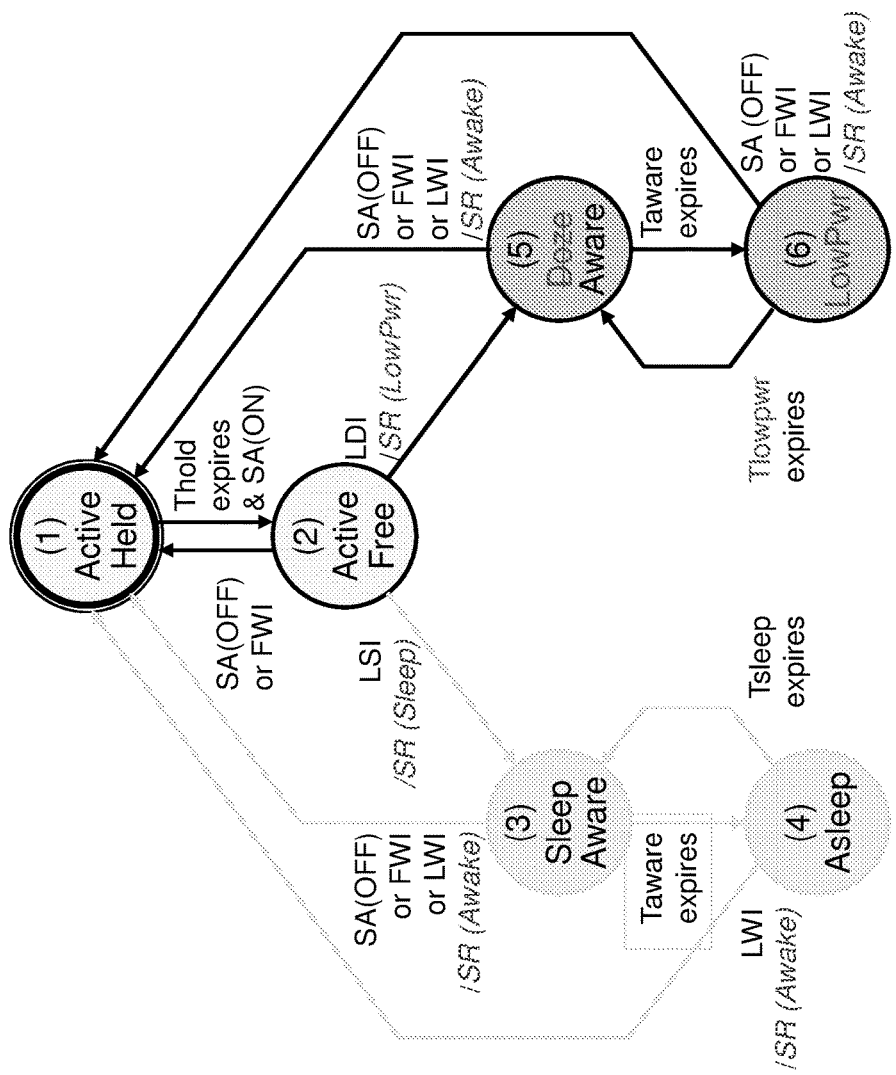
FIG. 7B is an alternate way of representing the ONU state machine of FIG. 7A.

FIG. 7B is an illustration of the ONU state machine in which the left side branch (sleep aware and asleep states) in FIG. 7A is eliminated to highlight low power aware operation.

Figure 7C:
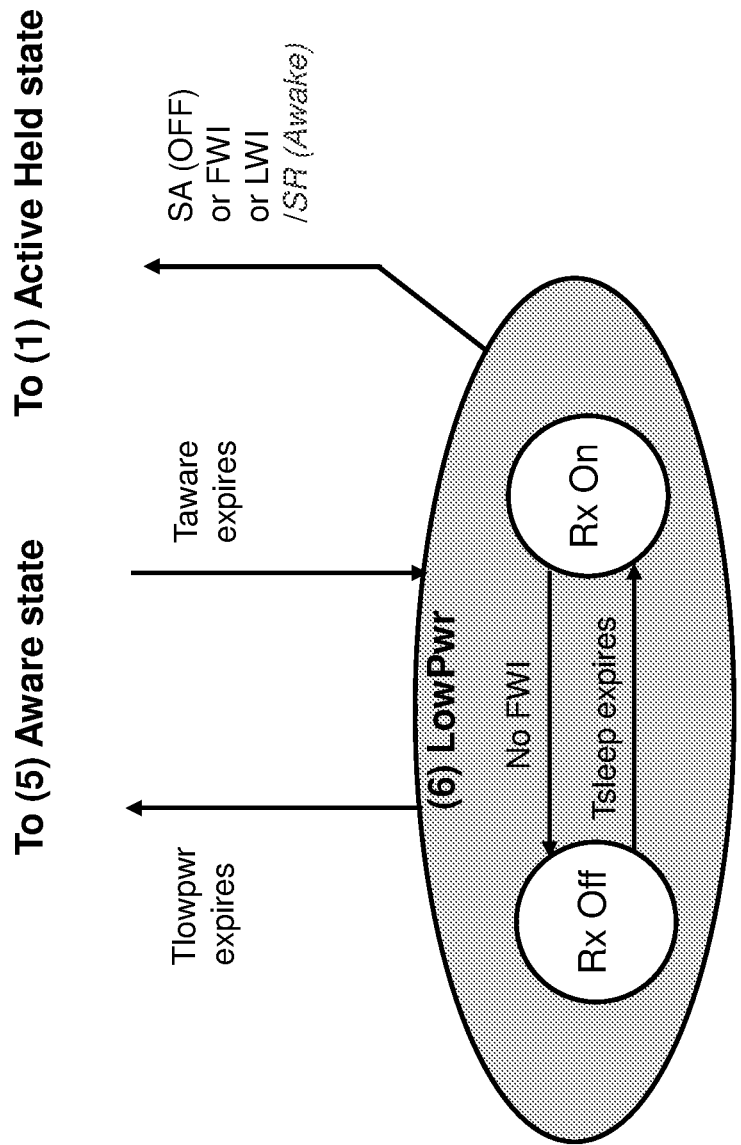
FIG. 7C is another embodiment of the ONU state machine of FIG. 7A.

FIG. 7C illustrates an expanded view of the internal semantics of the LowPower state to allow two alternating power levels (Receive or Rx on, and Rx off).

Figure 7D:
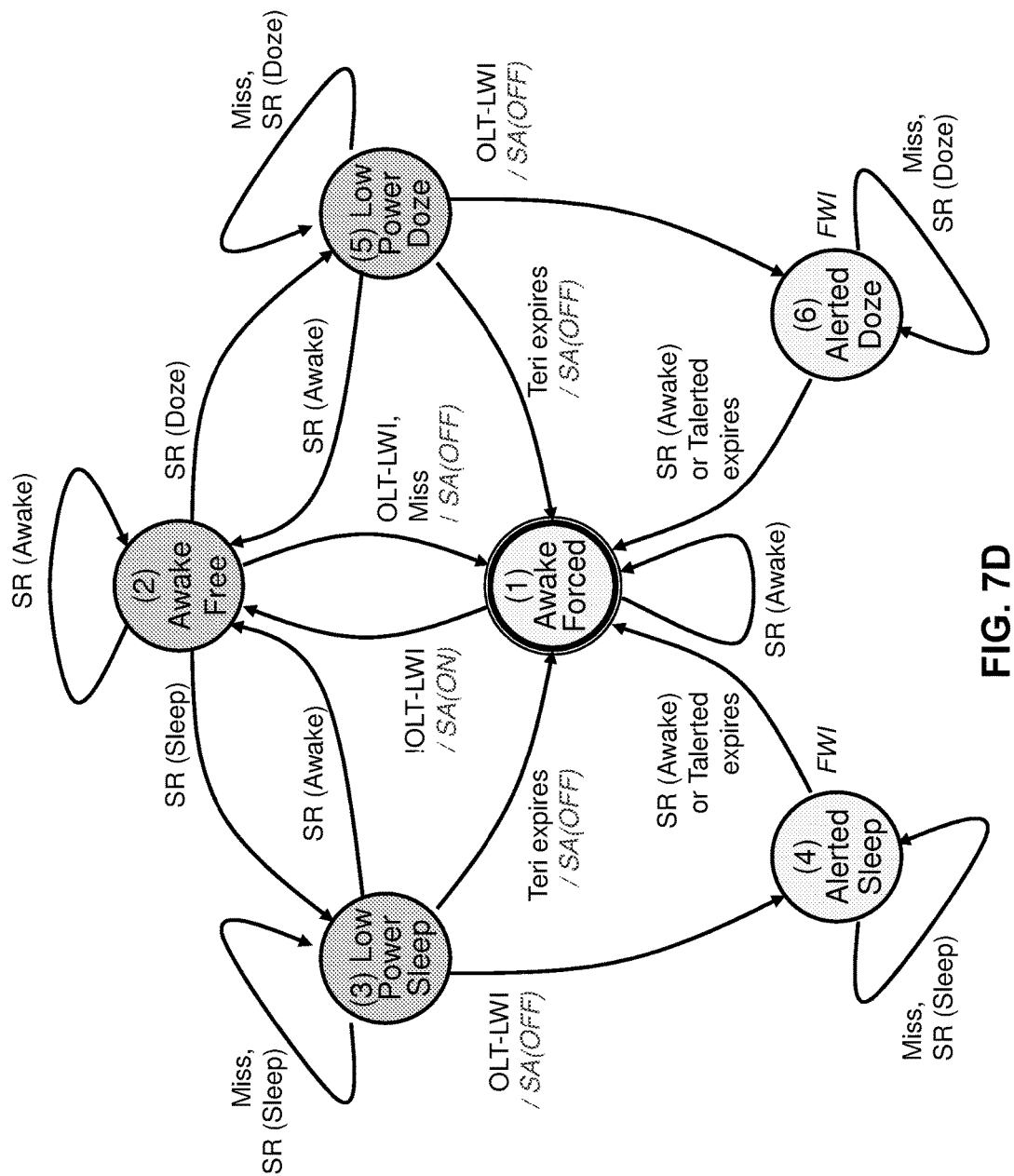
FIG. 7D illustrates an OLT state machine for power management.

FIG. 7D is an example of a prior art OLT state machine. Note that the transition between sleep and doze states always goes through an awake state.

Figure 7E:
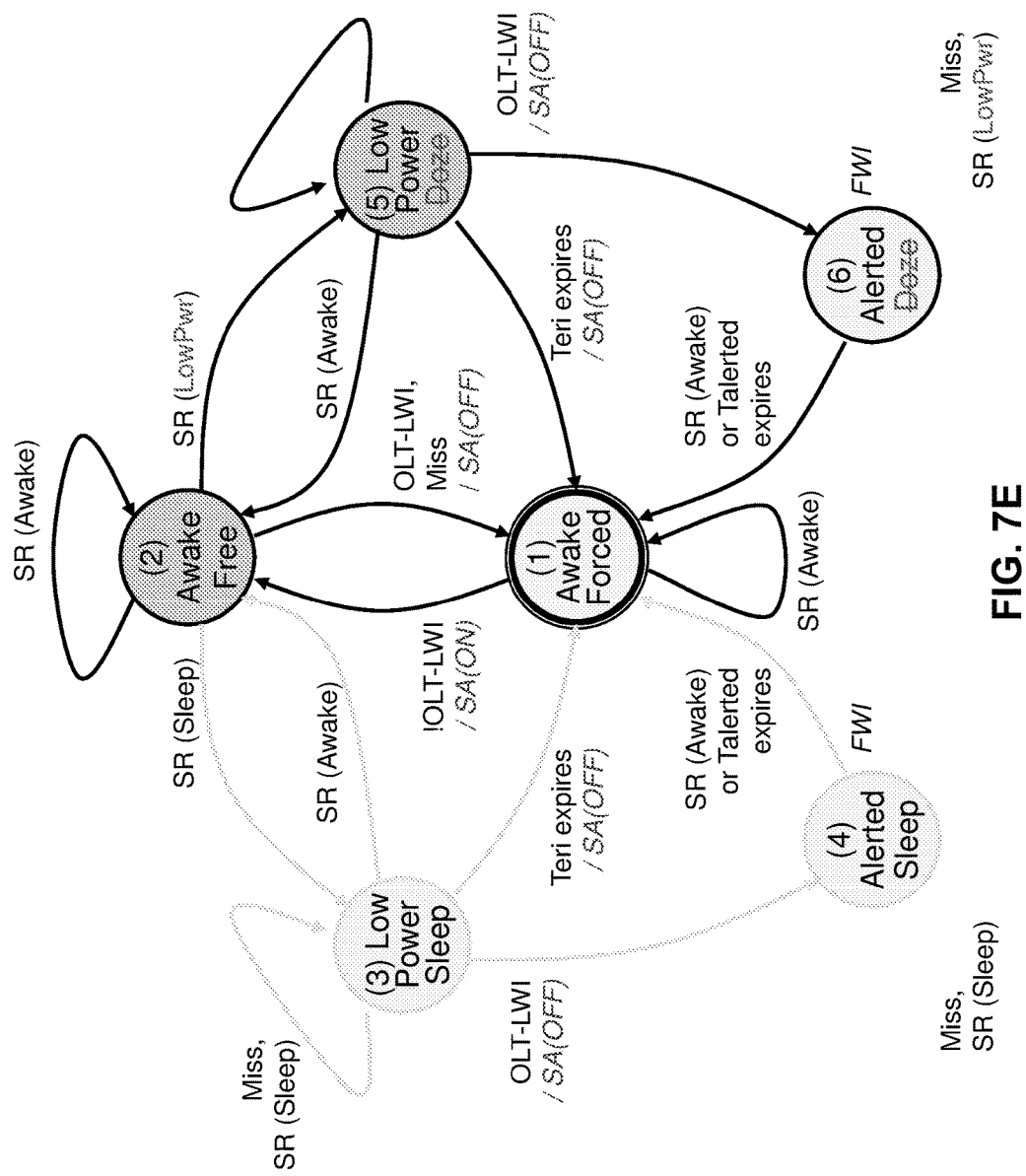
FIG. 7E illustrates an alternate embodiment of the OLT state machine depicted in FIG. 6.

FIG. 7E is an alternate embodiment of the state machine depicted in FIG. 6. The state diagram in FIG. 7E uses the state diagram depicted in FIG. 7D and eliminates one of the two low power branches.

FIG. 8 is a flow chart representation of a unified power management method 800. The method 800 may be implemented on an ONU 120.

At 802, method 800 operates an ONU in a first state in which a transmitter of the ONU is turned off and a receiver of the ONU is turned on. For example, in some implementations, the first state may be the dozing state 210 discussed above.

At 804, method 800 operates the ONU in a second state in which both the transmitter and the receiver are turned off. In some implementations, the second state may correspond to the sleep state 220 discussed above.

At 806, method 800 directly transitions the ONU between the first state and the second state, based on a power management rule. Direct transition refers to changing the operational state of the ONU between the first and the second states without having to go through an intermediate third state in which the power utilized by the ONU increases (e.g., as in the Active state previously discussed). One power management rule may be based on the timing parameters that control how long the ONU can be in the first or the second mode (e.g., in sleep or dozing mode, as discussed previously). Other power management rules include transitioning based on a user input (e.g., phone going off the hook), responding incoming control messages from the OLT that specify entering or exiting the first and the second states, and so on.

FIG. 9 is a block diagram representation of an optical communications apparatus 900. The module 902 is for operating an optical network unit (ONU) in a first state (e.g., dozing) in which a transmitter of the ONU is turned off and a receiver of the ONU is turned on. The module 904 is for operating the ONU in a second state (e.g., sleep state) in which both the transmitter and the receiver are turned off. The module 906 is for transitioning the ONU directly between the first state and the second state, based on a power management rule. In some implementations, the transition may be achieved autonomously (i.e. without communication with an external network entity). In some implementations, the transition may be based on a message received from another network entity such as the OLT. In some implementations, the transition may be based on obtaining permission to transit from one low power mode to another low power mode, obtained by sending a request message from the ONU to the OLT and receiving a corresponding grant message from the OLT.

FIG. 10 is a flow chart representation of a process 1000 of controlling operation of an optical network unit (ONU), operating in a passive optical network (PON).

At 1002, the process 1000 operates an OLT to generate a message that causes a direct transition of the ONU from a first low power mode in which the ONU is able to receive but not transmit to a second low power mode in which the ONU does not receive and transmit.

At 1004, the process 1000 transmits the generated message from the OLT to the ONU. As previously discussed, the OLT may control the low power operation of ONUs by either explicitly providing control messages or by granting requests from the ONUs, e.g., transitioning from a dozing mode to a sleep mode. In some implementations, the process 1000 may further locally keep track of the state in which each ONU served by the OLT is.

FIG. 11 is a block diagram representation of an optical communications apparatus 1100. The module 1102 is for operating an optical line terminal (OLT) to generate a message that causes a direct transition of the ONU from a first low power mode in which the ONU is able to receive but not transmit to a second low power mode in which the ONU does not receive and transmit. The module 1104 is for transmitting the generated message from the OLT to the ONU.

It will be appreciated that unified power management techniques are disclosed, allowing a device to extend battery life without unduly sacrificing responsiveness to communication requests. While the disclosed embodiments are with respect to the application to optical communications network, the disclosed techniques are equally applicable to other communications networks including wired and wireless networks.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of optical communication in a passive optical network, comprising:
operating an optical network unit (ONU) in a first state in which a transmitter of the ONU is turned off and a receiver of the ONU is turned on;
operating the ONU in a second state in which both the transmitter and the receiver are turned off;
transitioning the ONU directly from the first state to the second state and transitioning the ONU directly from the second state to the first state, based on a power management rule;
ensuring the ONU is fully powered up, synchronized, and capable of responding to both upstream and downstream traffic and control before exiting the first state or the second state; and
receiving, by the receiver, a power management message from an optical line terminal (OLT); and
changing the power management rule based on the received power management message.

2. The method of claim 1, further comprising:
operating the ONU in a third state in which both the transmitter and the receiver are turned on.

3. The method of claim 1, wherein the power management rule specifies a first time period for operation in the first state and a second time period for operation in the second state and wherein the transitioning is performed upon expiration of at least one of the first time period and the second time period.

4. The method of claim 1, further comprising:
transmitting, to an optical line terminal, a message indicative of the transitioning between the first state and the second state.

5. The method of claim 1, further comprising:
performing the transitioning responsive to the received power management message and a local decision to change an operational state.

6. An optical communication apparatus in a passive optical network, comprising:
means for operating an optical network unit (ONU) in a first state in which a transmitter of the ONU is turned off and a receiver of the ONU is turned on;
means for operating the ONU in a second state in which both the transmitter and the receiver are turned off;
means for transitioning the ONU directly from the first state to the second state and means for transitioning the ONU directly from the second state to the first state, based on a power management rule;
means for ensuring the ONU is fully powered up, synchronized, and capable of responding to both upstream and downstream traffic and control before exiting the first state or the second state; and
means for receiving, by the receiver, a power management message from an optical line terminal; and
means for changing the power management rule based on the received power management message.

7. The apparatus of claim 6, further comprising:
means for operating the ONU in a third state in which both the transmitter and the receiver are turned on.

8. The apparatus of claim 6, wherein the power management rule includes a first time period for operation in the first state and a second time period for operation in the second state and wherein the means for transitioning performs a state transition upon expiration of at least one of the first time period and the second time period.

9. The apparatus of claim 6, further comprising:
means for receiving a power management message from an optical line terminal; and
means for performing the transitioning responsive to the received power management message and a local decision to change an operational state.

10. An optical communication apparatus, comprising:
a memory that stores processor-executable instructions; and
a processor that uses the stored instructions to implement a method, comprising operating an optical network unit (ONU) in a first state in which a transmitter of the ONU is turned off and a receiver of the ONU is turned on; and operating the ONU in a second state in which both the transmitter and the receiver are turned off; and
wherein the processor includes means for transitioning the ONU directly from the first state to the second state and means for transitioning the ONU directly from the second state to the first state, based on a power management rule;
wherein the processor uses stored instructions to ensure the ONU is fully powered up, synchronized, and capable of responding to both upstream and downstream traffic and control before exiting the first state or the second state; and
wherein the processor further uses the stored instructions to implement the method by receiving, by the receiver, a power management message from an optical line terminal (OLT) and changing the power management rule based on the received power management message.

11. The apparatus as in claim 10, wherein the power management rule specifies a first time period for operation in the first state and a second time period for operation in the second state and wherein the transitioning is performed upon expiration of at least one of the first time period and the second time period.

12. An optical line terminal (OLT) for operation in a passive optical network (PON), the optical line terminal comprising:
a processor configured to generate messages for controlling a transition of an optical network unit from a first low power state in which a receiver of the optical network unit is turned on but a transmitter of the optical network unit is turned off to a second low power state in which both the receiver and the transmitter of the optical network unit are turned off;
a transmitter configured to transmit the generated messages to the optical network unit;
wherein the generated messages comprises a periodic consent message to allow the optical network unit to remain in either the first low power state or the second low power state.

13. The optical line terminal as in claim 12, wherein the processor includes means for specifying a first time period for operation in the first low power state and a second time period for operation in the second low power state and wherein the transition of the optical network unit from the first low power state to the second low power state is controlled to occur upon expiration of at least one of the first time period and the second time period.

14. A passive optical network (PON) communications system, comprising:
an optical network unit (ONU) operable in a first low power mode in which the ONU is able to receive but not transmit and a second low power mode in which the ONU is not able to either receive or transmit, wherein the ONU is configured to transition from the first low power mode to the second low power mode and to transition from the second low power mode to the first low power mode based on a power management rule, and wherein the ONU changes a power management rule based on a received power management message;

an optical line terminal (OLT) communicably coupled to the ONU, the OLT configured to transmit a control message to the ONU to control at least one aspect of transition of the ONU between the first low power mode and the second low power mode; and the ONU configured to ensure that the ONU is fully powered up, synchronized, and capable of responding to both upstream and downstream traffic and control before exiting the first low power mode or the second low power mode.

15. The system as in claim 14, wherein:

the OLT is configured to transmit the control message that includes the power management rule that specifies a first time period for operation in the first low power state and a second time period for operation in the second low power state and to control the ONU to transition from the first low power state to the second low power state upon expiration of at least one of the first time period and the second time period.

* * * * *